United States Patent
Cai et al.

(10) Patent No.: US 10,020,952 B1
(45) Date of Patent: Jul. 10, 2018

(54) PIM RELAY MODE IN COMPUTER NETWORKS

(71) Applicant: Juniper Networks, Inc., Sunnyvale, CA (US)

(72) Inventors: Xiangrong Cai, Wellesley, MA (US); Princy T. Elizabeth, Bangalore (IN); Zhaohui Zhang, Westford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 291 days.

(21) Appl. No.: 13/943,292

(22) Filed: Jul. 16, 2013

(51) Int. Cl.
*H04L 12/18* (2006.01)

(52) U.S. Cl.
CPC .............................. *H04L 12/1886* (2013.01)

(58) Field of Classification Search
None
See application file for complete search history.

(56) References Cited

U.S. PATENT DOCUMENTS

| | | | | |
|---|---|---|---|---|
| 7,558,219 | B1* | 7/2009 | Aggarwal | H04L 12/18 370/256 |
| 8,576,844 | B1* | 11/2013 | Ghosh | H04L 12/462 370/390 |
| 2007/0288653 | A1* | 12/2007 | Sargor | H04L 29/12405 709/245 |
| 2008/0175240 | A1* | 7/2008 | Suzuki | 370/390 |
| 2008/0205397 | A1* | 8/2008 | Xu | 370/390 |
| 2009/0041038 | A1* | 2/2009 | Martini et al. | 370/401 |
| 2013/0201988 | A1* | 8/2013 | Zhou et al. | 370/390 |

OTHER PUBLICATIONS

Fenner et al. "Protocol Independent Multicast-Sparce Mode (PIM-SM): Protocol Specification (Revised)" Network Working Group, RFC 4601, Aug. 2006, 148 pgs.*
Juniper Network, "reset-tracking-bit", Apr. 2013.*
Dornon et al., "PIM Snooping over VPLS draft-ietf-l2vpn-vpls-pim-snooping-02", Layer 2 Virtual Private Networks, Internet-Draft, Jul. 16, 2012, 39 pgs.
Holbrook, H. and B. Cain, "Source-Specific Multicast for IP", Network Working Group, RFC 4607, Aug. 2006, 19 pgs.
(Continued)

*Primary Examiner* — Christopher Crutchfield
*Assistant Examiner* — Thinh Tran
(74) *Attorney, Agent, or Firm* — Shumaker & Sieffert, P.A.

(57) ABSTRACT

Techniques are described for operating a network switch device associated with a virtual layer two (L2) network instance according to a protocol independent multicast (PIM) relay mode. The PIM relay mode enables the network switch device to receive a PIM control message, i.e., a PIM join and/or prune request, for a multicast group on a downstream port of the network switch device associated with a virtual L2 network instance, determine an upstream neighbor port of the network switch device associated with the instance, and relay the PIM control message on the upstream neighbor port of the network switch device without flooding the PIM control message on all ports of the switch device associated with the instance. In the PIM relay mode, the network switch device avoids triggering join suppression in downstream PIM neighbor devices with receivers, and avoids maintaining upstream states and setting a PIM periodic message timer.

33 Claims, 6 Drawing Sheets

(56) References Cited

OTHER PUBLICATIONS

Handley et al. "Bidirectional Protocol Independent Multicast (BIDIR-PIM)", Network Working Group, RFC 5015, Oct. 2007, 43 pgs.
Adams et al. "Protocol Independent Multicast—Dense Mode (PIM-DM): Protocol Specification (Revised)" Network Working Group, RFC 3973, Jan. 2005, 61 pgs.

* cited by examiner

PIM RELAY MODE IN COMPUTER NETWORKS

TECHNICAL FIELD

The invention relates to computer networks and, more particularly, to multicast traffic in local area networks (LANs) established over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

A private network may include a number of devices, such as computers, owned or administered by a single enterprise. These devices may be grouped into a number of site networks, and these sites may be geographically distributed over a wide area. As one example, each site network may include one or more local area networks (LANs) connecting the devices at the particular site. In Virtual Private LAN Service (VPLS), provider edge (PE) devices of a service provider network or public network, such as the Internet, may provide a logical interconnect such that customer edge (CE) devices of the site networks belonging to a specific VPLS instance appear to be connected by a single LAN. In order to emulate the single LAN over the public network, the PE devices operate as switches and establish full mesh connectivity with other PE devices associated with the specific VPLS instance. In this case, the PE devices treat multicast traffic as broadcast traffic and flood the multicast traffic to every port associated with the VPLS instance.

In some cases, the CE devices included in the may use protocol independent multicast (PIM) as a multicast routing protocol to transmit multicast traffic from sources to receivers for particular multicast groups within the network sites. The CE devices communicate using PIM Hello messages and PIM control messages, including join requests and prune requests, for multicast groups in order to build a multicast tree for the VPLS instance. In VPLS, the PIM messages between the CE devices are forwarded across the public network by the PE devices. Specifically, the PE devices flood the PIM control messages on all ports of the PE devices associated with the VPLS instance. In addition, as long as at least one receiver of a CE device included in the VPLS instance requests to join a particular multicast group, the PE devices flood the multicast traffic for the multicast group on all ports of the PE devices associated with the VPLS instance.

SUMMARY

In general, techniques are described for operating a network switch device, e.g., a provider edge (PE) device associated with a virtual layer two (L2) network instances, such as a virtual private local area network service (VPLS) instance, according to a protocol independent multicast (PIM) relay mode. The PIM relay mode described herein enables the PE device to relay or resend PIM control messages, i.e., PIM join and/or prune requests, received on downstream ports associated with the VPLS instance onto only upstream neighbor ports of the PE device associated with the VPLS instance. In the PIM relay mode, the PE device does not flood the PIM control messages on all ports of the PE device, and does not send the PIM control messages on downstream ports connected to PIM neighbor devices with receivers. In this way, the PE device avoids triggering join suppression in downstream PIM neighbor devices with receivers. In addition, in the PIM relay mode, the PE device does not construct a new PIM control message and, therefore, the PE device avoids maintaining upstream states and does not need to set a PIM periodic message timer.

In one example, the techniques of this disclosure are directed toward a method comprising receiving, with a network switch device, a PIM control message for a multicast group on a downstream port of the network switch device associated with a virtual L2 network instance, determining an upstream neighbor port of the network switch device associated with the virtual L2 network instance, wherein the upstream neighbor port is toward a source for the multicast group, and relaying the PIM control message on the upstream neighbor port of the network switch device without flooding the PIM control message on all ports of the switch device associated with the virtual L2 network instance, wherein relaying the PIM control message comprises forwarding the same PIM control message received on the downstream port of the network switch device on the upstream neighbor port of the network switch device without consuming the received PIM control message or forming a new PIM control message.

In another example, the techniques of this disclosure are directed to a network switch device comprising one or more ports, wherein a downstream port of the network switch device associated with a virtual L2 network instance receives a PIM control message for a multicast group, and a control unit configured to determine an upstream neighbor port of the network switch device associated with the virtual L2 network instance, wherein the upstream neighbor port is toward a source for the multicast group, and relay the PIM control message on the upstream neighbor port without flooding the PIM control message on all ports of the switch device associated with the virtual L2 network instance, wherein the control unit is configured to forward the same PIM control message received on the downstream port of the network switch device on the upstream neighbor port of the network switch device without consuming the received PIM control message or forming a new PIM control message.

In a further example, the techniques of this disclosure are directed to a computer-readable medium comprising instructions that, when executed, cause one or more programmable processors of a network switch device to receive a PIM control message for a multicast group on a downstream port of the network switch device associated with a virtual L2 network instance, determine an upstream neighbor port of the network switch device associated with the virtual L2 network instance, wherein the upstream neighbor port is toward a source for the multicast group, and relay the PIM control message on the upstream neighbor port of the network switch device without flooding the PIM control message on all ports of the switch device associated with the virtual L2 network instance, wherein the instructions cause the programmable processors to forward the same PIM control message received on the downstream port of the network switch device on the upstream neighbor port of the network switch device without consuming the received PIM control message or forming a new PIM control message.

The details of one or more examples of the invention are set forth in the accompanying drawings and the description below. Other features, objects, and advantages of the invention will be apparent from the description and drawings, and from the claims.

DETAILED DESCRIPTION

This disclosure describes techniques for operating a provider edge (PE) device associated with a virtual layer two (L2) network instance, such as a virtual private local area network service (VPLS) instance, according to a protocol independent multicast (PIM) relay mode. In some cases, a PE device may operate according to a PIM snooping mode in order to avoid flooding multicast traffic on all ports of the PE devices. In the PIM snooping mode, the PE device "snoops" PIM Hello messages and PIM control messages transmitted between customer edge (CE) devices to learn the PIM neighbor devices included in a given VPLS instance and to learn which PIM neighbor devices have receivers interested in traffic of a particular multicast group. The PE device uses the snooped information to forward the traffic of the particular multicast group to only those ports connected to PIM neighbor devices that have downstream receivers requesting the traffic of the multicast group. The PIM snooping mode requires that each CE device with receivers interested in the traffic of the multicast group sends a PIM control message requesting to receive the multicast traffic for the PE device to snoop.

The techniques of this disclosure are generally described with respect to VPLS for purposes of example. In other examples, the techniques may be performed in any other virtual L2 network instance. Conventionally, in VPLS, PIM control messages received on a downstream port are flooded on all ports of the PE device associated with the VPLS instance. In the case of a LAN with a large number of members, or a network with a large number of LANs, this leads to a large amount of control traffic. In some cases, the CE devices may use join suppression to reduce the PIM control messages transmitted upstream toward the source for the same multicast group. For example, in the case of join suppression, when the CE devices see a PIM join request for a multicast group from another CE device included in the VPLS instance, the CE devices suppress sending additional PIM join request for the same multicast group because the traffic will be flooded in the VPLS instance. When PIM snooping and join suppression are combined, however, receivers of the CE devices with suppressed join requests for the multicast group may not receive the multicast traffic because the PE device cannot snoop suppressed join requests.

In other cases, a PE device may operate according to a PIM proxy mode to avoid triggering join suppression in downstream PIM neighbor devices with receivers and to reduce PIM control traffic in the VPLS. IN PIM proxy mode, the PE device constructs a single PIM control message that includes all join and prune requests received on downstream ports of the PE device. The PE device then transmits the newly created PIM control message only on an upstream neighbor port of the PE device. The PIM proxy mode, however, requires the PE device to maintain a large amount of upstream states and to guess at a correct PIM periodic message timer for sending the newly created PIM control message on the upstream neighbor port.

According to the techniques of this disclosure, the PIM relay mode enables the PE device to relay or resend PIM control messages, i.e., PIM join and/or prune requests, received on downstream ports associated with the VPLS instance onto only upstream neighbor ports of the PE device associated with the VPLS instance. In the PIM relay mode, the PE device does not flood the PIM control messages on all ports of the PE device, and does not send the PIM control messages on downstream ports connected to PIM neighbor devices with receivers. In this way, the PE device avoids triggering join suppression in downstream PIM neighbor devices with receivers. In addition, in the PIM relay mode, the PE device does not construct a new PIM control message and, therefore, the PE device avoids maintaining upstream states and does not need to set a PIM periodic message timer.

Figure 1:
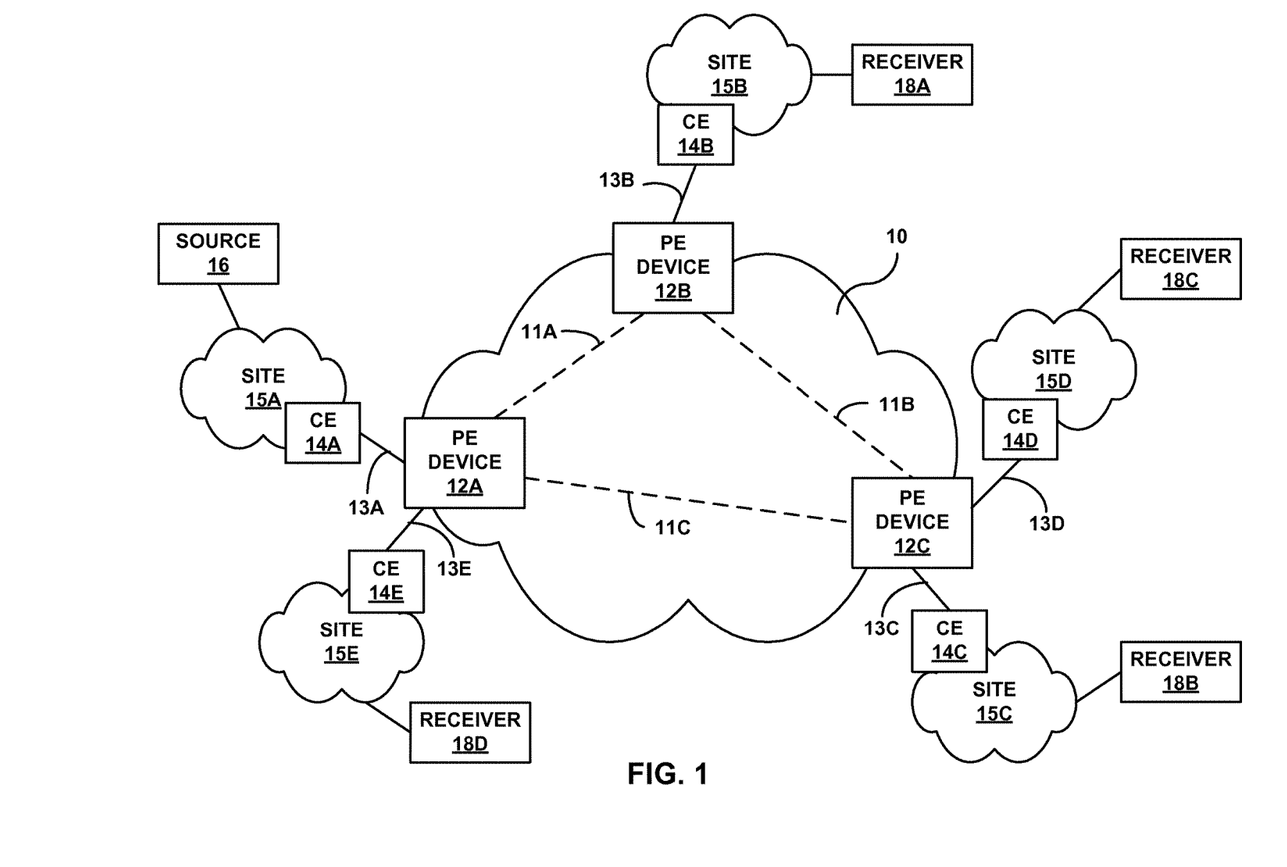
FIG. 1 is a block diagram illustrating an example computer network including provider edge (PE) devices configured to operate according to a PIM packet relay mode to transmit PIM control packets in a virtual private local area network service (VPLS) network.

FIG. 1 is a block diagram illustrating an example computer network including provider edge (PE) devices 12A-12C ("PE devices 12") configured to operate according to a PIM packet relay mode to transmit PIM control packets in a virtual private local area network service (VPLS) network. Computer network 10, for example, may be an enterprise network, a campus network, a service provider network, a home network, or another autonomous system. Each of site networks 15A-15C ("site networks 15") may comprise one or more local area networks (LANs) connecting devices at the particular site. In a VPLS instance, PE devices 12 may provide a logical interconnect across network 10 such that customer edge (CE) devices 14A-14C ("CE devices 14") of site networks 15 included in the specific VPLS instance appear to be connected by a single LAN. In this way, remotely located source 16 and receivers 18A-18B ("receivers 18") may securely share data via an emulated LAN over computer network 10.

Site networks 15 may each comprise a plurality of customer or subscriber devices, such as desktop computers, laptops, workstations, wireless devices, network-ready appliances, file servers, print servers or other devices. In some cases, the remote sites may be configured to support multicast traffic, such as Internet Protocol Television (IPTV), desktop conferences, corporate broadcasts, music and video web casts, and other forms of multimedia content.

For example, source 16 connected to site network 15A may comprise a source server of multicast traffic, and receivers 18 connected to site networks 15B-15E may comprise subscriber devices of the multicast traffic.

CE devices 14 may be layer three (L3) routing devices for their respective network sites 15. CE devices 14 may be configured to use PIM as a routing protocol. In this case, CE devices 14 exchange periodic PIM Hello messages to identify themselves as PIM neighbor devices included in the specific VPLS instance. Once CE devices 14 are discovered as PIM neighbors, CE devices 14 may send PIM control messages requesting to join or prune a multicast group. The PIM control messages may identify multicast groups using either a source specific (source, group) key or a generic source (*, group) key. In the illustrated example of FIG. 1, CE device 14A has a source 16 of the multicast group, CE device 14B has a receiver 18A, CE device 15C has a receiver 18B, CE device 15D has a receiver 18C and CE device 15E has a receiver 18D. If receiver 18A, for example, is interested in receiving traffic of the multicast group, CE device 14B may send a PIM control message in the VPLS toward source 16 requesting to join the multicast group.

Additional information regarding PIM protocols may be found in Holbrook, H. and B. Cain, "Source-Specific Multicast for IP," IETF RFC 4607, 2006; Handley, M., et al., "Bidirectional Protocol Independent Multicast (BIDIRPIM)," IETF RFC 5015, 2007; Adams, A., et al., "Protocol Independent Multicast Version 2—Dense Mode Specification," RFC 3973, 2005; and Fenner, B., et al., "Protocol Independent Multicast-Sparse Mode (PIM-SM): Protocol Specification (Revised)," RFC 4601, 2006, the entire contents of which are incorporated by reference herein.

In VPLS, PE devices 12 operate as network switch devices and establish full mesh connectivity with other PE devices associated with the specific VPLS instance. In some cases, PE devices 12 may be layer three (L3) routing devices configured to operate as layer two (L2) switching devices for the VPLS instance. PE devices 12 are configured to forward PIM messages and multicast traffic across computer network 10 between CE devices 14 include in the VPLS instance. According to the techniques of this disclosure, PE devices 12 do not need to maintain or share any routing information. Instead, PE devices 12 may forward traffic for the VPLS instance based on information snooped from the PIM Hello messages and the PIM control messages sent between CE devices 14.

In the example illustrated in FIG. 1, PE devices 12 are connected to each of CE devices 14 via attachment circuit (AC) ports 13A-13E ("AC ports 13"). More specifically, PE device 12A is connected to CE device 14A via an upstream neighbor AC port 13A and connected to CE device 14E via a downstream AC port 13E. PE device 12B is connected to CE device 14B via a downstream AC port 13B. PE device 12C is connected to CE device 14C via a downstream AC port 13C and connected to CE device 14D via a downstream AC port 13D. PE devices 12 are also connected to each other via pseudo-wires (PWs) 11A-11C ("PWs 11").

By default, PE devices 12 treat multicast traffic from source 16 as broadcast traffic and flood the multicast traffic on all ports of PE devices 12 associated with the VPLS instance. In some cases, PE devices 12 operate according to a PIM snooping mode to avoid flooding multicast traffic on all ports of the PE devices. In the PIM snooping mode, PE devices 12 "snoop" PIM Hello messages and PIM control messages transmitted between CE devices 14 to learn which PIM neighbor CE devices 14 are included in the VPLS instance and to learn which receivers 18 have requested to join or leave a particular multicast group. PE devices 12 then use the snooped information to transmit multicast traffic of the particular multicast group to only those ports connected to CE devices 14 that have downstream receivers 18 requesting the traffic of the multicast group. The PIM snooping mode requires that each of CE devices 14 with receivers 18 interested in the traffic of the multicast group sends a PIM control message requesting to receive the multicast traffic for PE devices 12 to snoop.

Conventionally, in VPLS, PE devices 12 receive PIM control messages on downstream ports associated with the VPLS instance requesting to join or leave a particular multicast group, and PE devices 12 flood the PIM control messages on all ports of the PE devices 12. For example, PE device 12B may receive a PIM control message on downstream AC port 13B connected to CE router 14B with receiver 18A, and PE device 12B floods the PIM control message on all ports of PE device 12B, including onto PWs 11A and 11B. In the case of a LAN with a large number of members, or a network with a large number of LANs, this leads to a large amount of control traffic in the VPLS.

In some cases, CE devices 14 may use join suppression to reduce the PIM control messages transmitted upstream toward source 16 for the same multicast group. For example, if PE device 12C floods a PIM join request for a multicast group received on downstream port 13C from CE device 14C onto port downstream port 13D connected to CE device 14D, CE device 14D suppresses sending an additional PIM join request for the same multicast group because the traffic of the multicast group will be flooded to both receiver 18B and 18C when PIM snooping is not used. In this case, only the PIM join message from CE device 14C with receiver 18B will be sent to source 16. When PIM snooping and join suppression are combined, however, receiver 18C of CE device 14D with a suppressed join request for the multicast group may not receive the multicast traffic because PE device 12C cannot snoop a suppressed join request. PE device 12C only transmits the traffic of the multicast group on downstream port 13C on which the PIM join request was received for receiver 18B.

In other cases, PE devices 12 may operate according to a PIM proxy mode to avoid triggering join suppression in CE devices 14 with receivers 18 and to reduce PIM control traffic in the VPLS. For example, in PIM proxy mode, PE device 12C constructs a single PIM control message that includes all join and prune requests received on downstream port 13C connected to CE device 14C with receiver 18B, and downstream port 13D connected to CE device 14D with receiver 18C. PE device 12C then transmits the newly created PIM control message only on an upstream neighbor port of PE device 12C, e.g., an upstream port of PW 11C toward PE device 12A. The PIM proxy mode, however, requires PE device 12C to maintain a large amount of upstream states and to guess at a correct PIM periodic message timer for sending the newly created PIM control message on the upstream neighbor port.

The PIM proxy mode may be used when join suppression is triggered in the VPLS instance. For example, join suppression may be enabled or triggered in the VPLS instance when a tracking bit is not set by all the PIM neighbor CE devices 14 included in the VPLS instance. When join suppression is triggered, CE devices 14 may suppress PIM join request due to seeing a PIM join request from another CE device included in the VPLS instance for the same multicast group. Join suppression, therefore, may cause a PIM snooping fail since pure PIM snooping requires each of CE devices 14 with receivers 18 interested in the traffic of the multicast group to send a PIM join request message for PE devices 12 to snoop.

Instead of flooding the PIM control messages on all ports as in pure PIM snooping mode, with VPLS split horizon in place to avoid forwarding the messages on the port on which the messages were received, each of PE devices 12 operating in PIM proxy mode collects PIM control messages received on all the downstream ports of the PE device, consumes the control packets, and condenses them into a single control packet to be sent on an upstream neighbor port of the PE device toward source 16. In this way, for the PIM control messages that come from different downstream ports, e.g., port 13C and port 13D, and target the same group, source, and/or upstream neighbor, PE device 12C only sends one copy of the new PIM control message on the upstream port, and does not send the new PIM control message on any downstream ports with receivers. PIM proxy mode effectively avoids join suppression by not sending the PIM control messages on the downstream ports with receivers, and reduces an amount of control packets by not flooding every PIM control message on all ports of the PE device, but only sending one condensed PIM control message on an upstream port of the PE device.

The first benefit of PIM proxy mode, i.e., avoiding join suppression, is a must in order to avoid breaking PIM snooping mode. On the other hand, the second benefit, i.e., reduce an amount of control packets, is only good-to-have because it reduces the control traffic to some degree. The second benefit, however, is not the goal of the PIM snooping mode, and it comes with the price of maintaining a PIM upstream finite state machine on each of PE devices 12, which could mean a lot of extra states that require a large amount of memory to be maintained in bigger data structures, and more system resources (e.g., CPU, timer, memory) being consumed. Comparing the reduced amount of PIM control messages with maintaining fewer PIM states and needing fewer resources, it difficult to say whether the second benefit of the PIM proxy mode is an actual beneficial in the VPLS.

In general, PE devices 12 operating in the PIM proxy mode collect all the PIM control messages, aggregate them, and send only one copy of a new PIM control message to the proper upstream interfaces for all the received PIM control messages that have the same (source, group) key identifying a multicast group. While this approach reduces the amount of PIM control packets sent on the VPLS, it consumes quite a lot of memory to maintain the upstream states and also consumes quite a lot of central processing unit (CPU) cycles to calculate the states and decide when to send what packet on the upstream ports. The PIM proxy mode is, therefore, very complicated to implement. PE devices 12 operating in the PIM proxy mode also need to guess the value of one of the key variables known at CE devices 14, i.e., the PIM periodic message timer for sending PIM control messages, in order to properly operate with CE devices 14. In the case where this periodic interval is set to non-default, it is almost impossible to guarantee that PE devices 12 will choose a correct value for the PIM periodic message timer. Additional information regarding the PIM snooping mode and the PIM Proxy mode may be found in an IETF draft, Dornon, O., et al., "PIM Snooping over VPLS," draft-ietf-l2vpn-vpls-pim-snooping-02, Jul. 16, 2013, available at http://tools.ietf.org/id/draftietf-l2vpn-vpls-pim-snooping-02.txt, the entire content of which is incorporated by reference herein.

The techniques of this disclosure include a PIM packet relay mode that avoids flooding all PIM control traffic, avoids join suppression, and avoids introducing additional upstream states. PE devices 12 operating in the PIM packet relay mode relay or resend PIM control packets received on downstream ports only on upstream ports that are associated with the VPLS instance. In the PIM packet relay mode, PE devices 12 will not flood the PIM control packet on all ports of the PE devices 12, and will not transmit the PIM control packet on downstream ports with receivers. In addition, in the PIM packet relay mode, the PE devices 12 will not construct a new PIM control packet and, therefore, PE devices 12 will not need to maintain upstream states and will not need to set the PIM periodic message timer.

In PIM relay mode, the PIM control messages are relayed by PE devices 12 on a set of upstream ports so that all upstream interfaces that need to see the PIM control messages receive the messages, and no downstream ports with receivers will be join-suppressed. The set of upstream ports may be determined based on labels included in the PIM control messages, a multicast state table, and/or a PIM neighbor database maintained at PE devices 12. The set of upstream ports at least includes an upstream neighbor port of PE devices 12 associated with the VPLS instance. For example, upon receiving a PIM control message on downstream port 13E, PE device 12A determines an upstream neighbor port as port 13A of PE device 12A connected to upstream PIM neighbor device CE device 14A with source 16. In some cases, the upstream PIM neighbor device may be identified in an upstream neighbor field included in the PIM control message. The upstream neighbor port is the port on which the upstream PIM neighbor device was learned, i.e., RPort(N).

In this disclosure, the terms "relayed" or "resent" are used instead of "sent" in order to indicate that the received PIM control messages are not consumed to form a new PIM control message. Instead, the same PIM control message is relayed to the set of upstream ports. As a result, the join suppression problem in the PIM snooping mode is solved, and multicast traffic is forwarded only to intended ports connected to CE devices 14 that have downstream receivers 18 interested in receiving the traffic.

For each PIM control message that is seen or received, PE devices 12 take any prune requests included in the PIM control message and form a new prune message. PE devices 12 then flood this new prune packet on all the ports, except the upstream neighbor port on which the original PIM control message was sent. PE devices 12 essentially flood the new prune message the same way as in pure PIM snooping mode. In some cases, PE devices 12 may ensure that the new prune message is not sent on any of the ports to which it was already relayed as the original PIM control message.

In summary, in the PIM relay mode, PE devices 12 only relay the original PIM control messages on upstream ports, and flood new prune messages on other ports. Unlike the PIM proxy mode, the PIM relay mode will not cause PE devices 12 to generate new PIM control messages from collected PIM control messages. According to the techniques, PIM relay mode avoids join suppression the same way as the PIM proxy mode does by not sending the PIM control messages on downstream ports connected to PIM neighbor devices with receivers. The PIM relay mode does not reduce much control traffic compared with the PIM proxy mode. As discussed above, however, the reduction in control traffic may help scalability but it is not a dramatic improvement given the extra states and resources needed to operate in PIM proxy mode.

The PIM relay mode does reduce some control traffic compared with the pure PIM snooping mode where all the PIM control messages are flooded on all ports. Pure PIM snooping mode is the default mode when all CE devices 14 have a tracking bit set (i.e., none of CE devices 14 want to do join suppression). When at least one of CE devices 14 does not have the tracking bit set (i.e., join suppression is enabled or triggered in the VPLS instance), then PE devices 12 may operate in the PIM relay mode.

One other benefit of the PIM relay mode is that it does not need to configure the PIM periodic message timer, i.e., periodic_jp_interval, which is the interval on which to send the periodic PIM control messages. This interval needs to be chosen or configured in PIM proxy mode because PE devices 12 need to know how often to send the newly created PIM control message, but it is almost impossible to choose the correct value for this interval given that the interval comes from CE devices 14. PE devices 12 and CE devices 14 normally belong to different administrative domains and thus PE devices 12 do not know the configuration of CE devices 14. With PIM relay mode, this problem of selecting the correct interval is avoided because CE devices 14 remain in control of periodically sending the PIM control messages to be relayed by PE devices 12.

The techniques of this disclosure solve one or more issues. In general, PE devices 12 operating in PIM relay mode do not need to keep memory consuming upstream states, use much less CPU computation, are much easier to implement and thus less error prone, and do not need to guess the periodic join/prune interval because there is no need of such a variable at PE devices 12.

Figure 2:
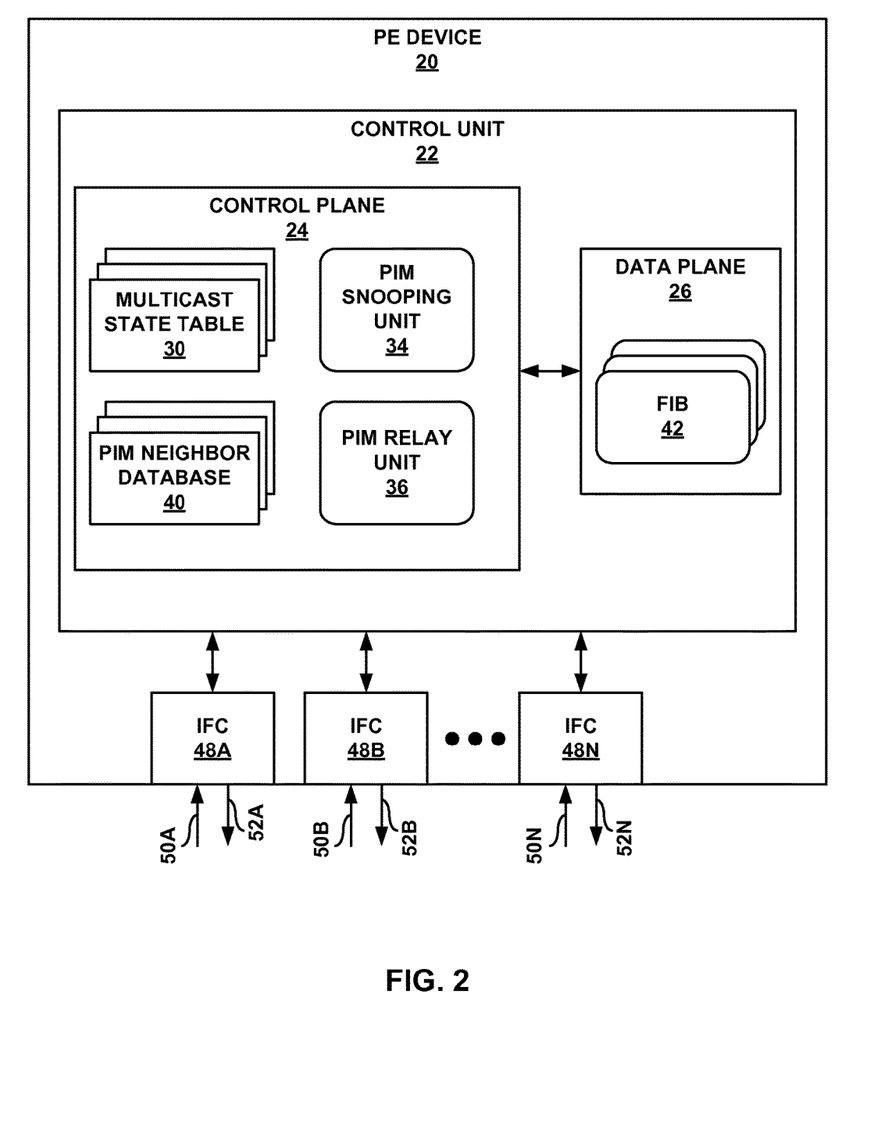
FIG. 2 is a block diagram illustrating an exemplary PE device configured to execute a PIM packet relay unit in a control plane to transmit PIM control packets according to the techniques of this disclosure.

FIG. 2 is a block diagram illustrating an exemplary PE device 20 capable of operating according to a PIM packet relay mode to transmit PIM control packets in a VPLS network. PE device 20 may operate substantially similar to any of PE devices 12 from FIG. 1. In the illustrated example, PE device 20 includes interface cards 48A-48N ("IFCs 48") that include a number of interface ports to receive multicast packets via incoming links 50A-50N ("incoming links 50") and to send multicast packets via outbound links 52A-52N ("outbound links 52"). PE device 20 also includes a control unit 22 that determines routes of received packets and forwards the packets accordingly via the ports of IFCs 48.

Control unit 22 may comprise a control plane 24 and a data plane 26. In some examples, PE device 20 may comprise a L3 routing device configured to operate as a L2 switching device for a VPLS instance. In this case, control plane 24 may implement one or more routing protocols to execute routing processes and maintain routing information for a network. According to the techniques of this disclosure, however, PE device 20 does not need to maintain or share any routing information. Instead, PE devices 20 may forward traffic for the VPLS instance based on information snooped from PIM Hello messages and PIM control messages in the VPLS.

In the illustrated example, control plane 24 includes two operational units, PIM snooping unit 34 and PIM relay unit 36. PIM snooping unit 34 "snoops" PIM Hello packets to discover identities of the PIM neighbor devices included in a given VPLS instance and their characteristics. The PIM neighbor devices send the PIM Hello messages periodically such that a device may be removed as a PIM neighbor if a PIM Hello message is not received within a defined interval. PIM snooping unit 34 updates a PIM neighbor database 40 for the VPLS instance based on the identities of the PIM neighbor devices snooped from the PIM Hello messages.

PIM snooping unit 34 also "snoops" PIM control messages, e.g., join messages and prune messages, forwarded upstream toward a source device to learn which receivers have requested to join or leave a particular multicast group in a given VPLS instance. PIM snooping unit 34 maintains multicast state table 30 for the given VPLS instance based on a downstream port on which the PIM control message is received and information for the multicast group snooped from the PIM control message. Multicast state table 30 includes a list of downstream ports of PE device 20 that are outgoing interfaces for traffic of the given multicast group. In addition, multicast state table 30 may include a list of upstream ports of PE device 20 that are incoming interfaces for traffic of the given multicast group.

Control plane 24 analyzes multicast state table 30 and PIM neighbor database 40 and generates forwarding information for inclusion in forwarding information base (FIB) 42 of data plane 26. Data plane 26 may maintain a separate FIB per VPLS instance. FIB 42 may associate, for example, network destinations for certain multicast groups with specific next hops and corresponding output ports.

PIM relay unit 36 relays a PIM control message for a given multicast group received on downstream ports of PE device 20 only on a set of upstream ports associated with the VPLS instance. The set of upstream ports at least includes an upstream neighbor port of PE device 20 associated with the VPLS instance. PIM relay unit 36 may determine the upstream neighbor port on which to relay the PIM control message as a port of PE device 20 connected to an upstream PIM neighbor device identified in an upstream neighbor field included in the PIM control message.

In this disclosure, "relaying" the PIM control message includes forwarding the same PIM control message received on the downstream port of PE device 20 on the upstream neighbor port of PE device 20 without consuming the received PIM control message or forming a new PIM control message. By only relaying the PIM control message on the upstream neighbor port, control traffic flooding on all ports of PE device 20 and join suppression due to the flooded control traffic are avoided. For example, because the PIM control messages will not be flodded on downstream ports of PE device 20, the PIM neighbor devices with receivers will not see the other join requests for the same multicast group in the VPLS instance, and will not suppress additional join requests for the multicast group.

In addition to relaying the original PIM control message on the upstream neighbor port, PIM relay unit 36 also floods PIM prune messages or prune portions of PIM control messages on all ports of PE router 20 associated with the VPLS instance. For example, if PE device 20 receives a PIM prune message on a downstream port, PIM relay unit 36 floods the PIM prune message on all ports of PE router 20. In another example, if PE device 20 receives a PIM control message including a join portion and a prune portion of the message on a downstream port, PIM relay unit 36 relays the original PIM control message on the upstream neighbor port, creates a new prune message including only the prune portion of the original PIM control message, and floods the new prune message on all ports of PE device 20 except the upstream neighbor port that has already received the original PIM control message. In response to receiving the flooded prune request from PE device 20, other CE devices may re-send a join packet for the same multicast group to override the prune request for their receivers.

The architecture of PE device 20 illustrated in FIG. 2 is shown for exemplary purposes only. The invention is not limited to this architecture. In other examples, PE device 20 may be configured in a variety of ways. In one example, some of the functionally of control unit 22 may be distributed within IFCs 48. In another example, control unit 22 may comprise a plurality of packet forwarding engines.

Control unit 22 may be implemented solely in software, or hardware, or may be implemented as a combination of software, hardware, or firmware. For example, control unit 22 may include one or more processors which execute software instructions. In that case, the various software modules of control unit 22 may comprise executable instructions stored on a computer-readable medium, such as computer memory or hard disk.

Figure 3:
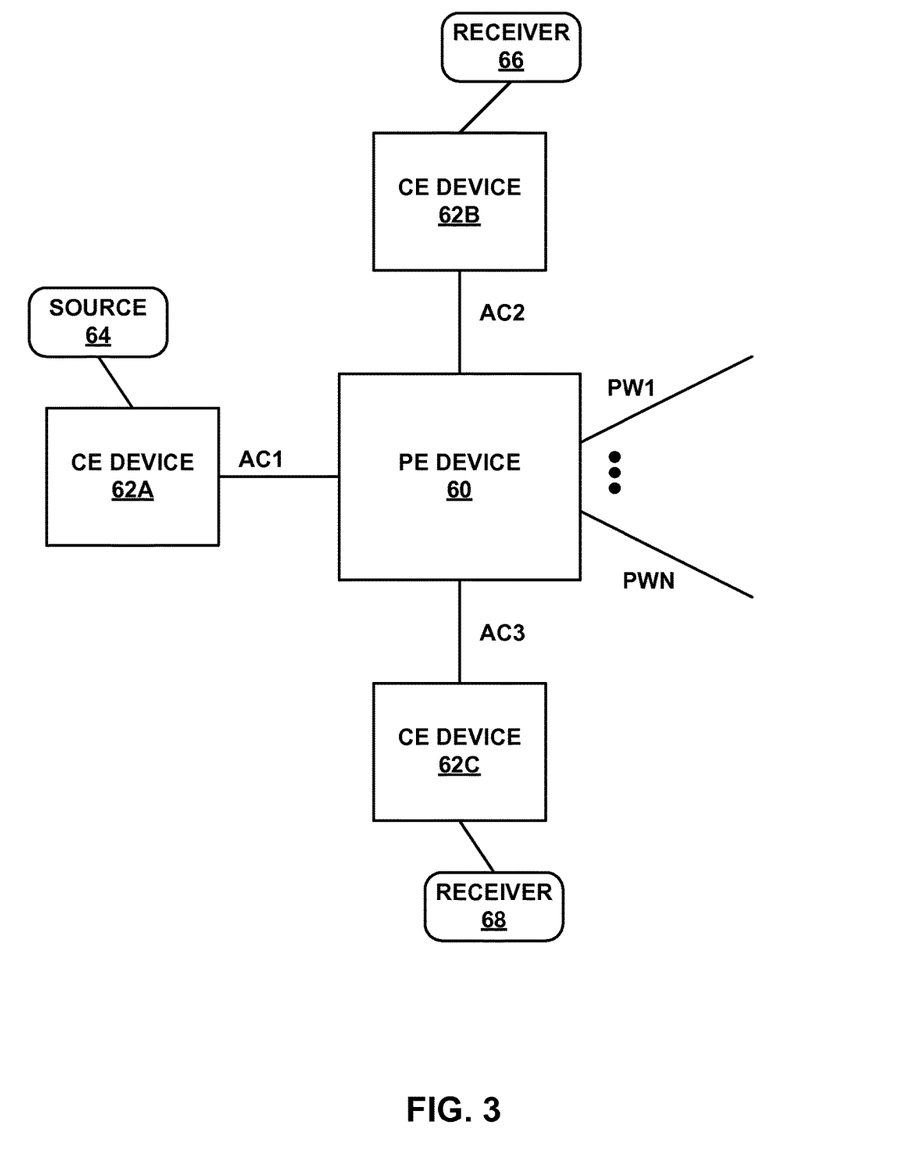
FIG. 3 is a block diagram illustrating another exemplary PE device connected to exemplary customer edge (CE) devices and configured to transmit PIM control packets between the CE devices according to a PIM packet relay mode.

FIG. 3 is a block diagram illustrating another exemplary PE device 60 connected to exemplary customer edge (CE) devices 62A-62C ("CE devices 62") and configured to transmit PIM control packets between CE devices 62 according to a PIM packet relay mode. Each of CE devices 62 may be included in remote site networks that may comprise LANs. The LANs of the remote site networks may be emulated across a public network that includes PE device 60 to create a VPLS instance that includes CE devices 62. In this way, CE devices 62 may communication as if they were included in a single LAN.

CE devices 62 may comprise L3 routing devices configured to use PIM as a routing protocol. In this case, CE devices 62 exchange periodic PIM Hello messages to identify themselves as PIM neighbor devices for the VPLS instance. Once CE devices 62 are discovered as PIM neighbors, CE devices 62 may send PIM control messages requesting to join or prune a multicast group. In the illustrated example, CE device 62A has a source 64 of the multicast group, CE device 62B has a receiver 66, and CE device 62C has a receiver 68. If receiver 66 is interested in receiving traffic of the multicast group, CE device 62B may send a PIM control message toward source 64 requesting to join the multicast group. Likewise, if receiver 68 is interested in receiving traffic of the multicast group, CE device 62C may send a PIM control message toward source 64 requesting to join the multicast group.

PE device 60 is a network switch device configured to forward PIM messages and multicast traffic across the public network between CE devices 62 include in the VPLS instance. In some cases, PE device 60 may comprise a L3 routing device of the public network that is configured to operate as a L2 switching device for the VPLS instance. According to the techniques of this disclosure, PE device 60 does not need to maintain or share any routing information. Instead, PE device 60 may build a FIB to forward traffic for the VPLS instance based on information snooped from the PIM Hello messages and the PIM control messages sent between CE devices 62.

In the example illustrated in FIG. 3, PE device 60 is connected to each of CE devices 62 via attachment circuit ports (AC1-AC3). More specifically, PE device 60 is connected to CE device 62A via an upstream neighbor AC port, AC1. PE device 60 is connected to CE device 62B via a downstream AC port, AC2, and is connected to CE device 62C via a downstream AC port, AC3. PE device 60 is also connected to other PE devices (not shown) associated with the VPLS instance via pseudo-wire ports (PW1-PWN). The other PE devices associated with the VPLS instance may, in turn, be connected to other CE devices included in the VPLS instance.

In general, when PE device 60 operates in the PIM relay mode in accordance with the techniques of this disclosure, PE device 60 receives a PIM control message for the multicast group on a downstream port associated with the VPLS instance, determines an upstream neighbor port of PE device 60 associated with the VPLS instance, and relays the PIM control message on the upstream neighbor port without flooding the PIM control message on all ports of PE device 60 associated with the VPLS instance. In the illustrated example, upon receiving the PIM control message on a downstream port, PE device 60 determines that AC1 is the upstream neighbor port connected to an upstream PIM neighbor device identified as CE device 62A with source 64 in an upstream neighbor field included in the PIM control message.

The specific operation of PE device 60 in the PIM relay mode may differ depending on whether the PIM control message is received on a downstream AC port or a downstream PW port. In one example, when PE device 60 receives a PIM control message on a downstream AC port, e.g., AC2 connected to CE device 62B with receiver 66, PE device 60 relays the PIM control message on an upstream neighbor port only if the upstream neighbor port is an AC port. In this case, PE device 60 relays the PIM control message on upstream neighbor port AC1 connected to upstream PIM neighbor CE device 62A. In addition, PE device 60 relays the PIM control message received on downstream port AC2 on all of PW ports, PW1-PWN, connected to the other PE devices associated with the VPLS instance. In this example, PE device 60 relays the PIM control message on a set of upstream ports that at least includes the determined upstream neighbor AC port, AC1. PE device 60 does not send the PIM control message on any downstream AC ports of PE device 60 connected to CE devices with receivers, e.g., AC2 and AC3.

In another example, when PE device 60 receives a PIM control message on a downstream PW port, e.g., PW1 connected to another PE device associated with the VPLS instance, PE device 60 relays the PIM control message on an upstream neighbor port only if the upstream neighbor port is an AC port. In this case, PE device 60 relays the PIM control message on upstream neighbor port AC1 connected to upstream PIM neighbor CE device 62A. PE device 60 does not send the PIM control message received on downstream port PW1 on any of the PW ports of PE device 60. PE device 60 also does not send the PIM control message on any downstream AC ports of PE device 60 connected to CE devices with receivers, e.g., AC2 and AC3.

Figure 4:
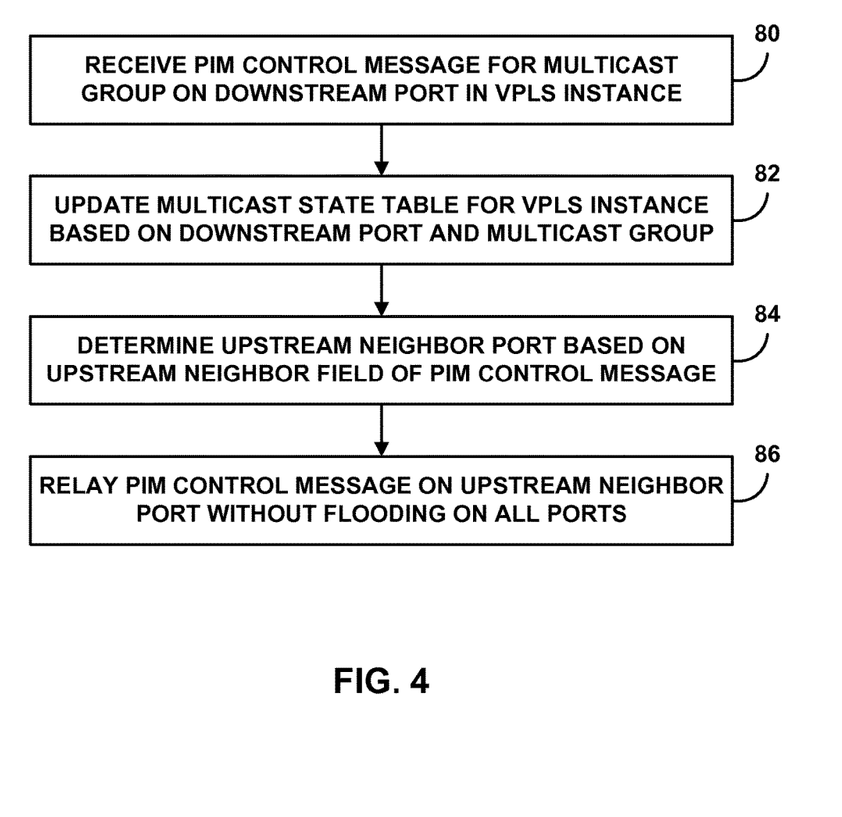
FIG. 4 is a flow chart illustrating an exemplary operation of a PE device in a PIM packet relay mode to transmit PIM join messages upstream.

FIG. 4 is a flow chart illustrating an exemplary operation of a PE device in a PIM packet relay mode to transmit PIM join messages upstream. The operation illustrated in FIG. 4 is described with respect to PE device 20 from FIG. 2. In other examples, other PE devices, such as PE devices 12 from FIG. 1 and PE device 60 from FIG. 3 may operate in the PIM packet relay mode in accordance with the techniques of this disclosure.

As described above with respect to FIG. 2, IFCs 48 of PE device 20 each include one or more interface ports coupled to incoming links 50 and outgoing links 52. One or more of the ports of PE device 20 may be AC ports connected to PIM neighbor devices included in a given VPLS instance, such as CE devices 14 from FIG. 1 or CE devices 62 from FIG. 3. In addition, at least some of the ports of PE device 20 may be PW ports connected to other PE devices associated with the given VPLS instance, such as PE devices 12 from FIG. 1.

A downstream port of PE device 20 associated with the given VPLS instance receives a PIM control message for a multicast group (80). As described in this disclosure, "receiving" the PIM control message on a port means that PE device 20 snoops information included in the PIM control message while forwarding the PIM control message in the VPLS instance. In some cases, the PIM control message may include only a join message for the multicast group from a downstream PIM neighbor device with a receiver interested in traffic of the multicast group. In other cases, the PIM control message may include both a join portion and a prune portion of the message for different multicast groups from a downstream PIM neighbor device with receivers interested in receiving and dropping traffic of the different multicast groups. Additional operations performed by PE device 20 when the PIM control message includes both a join portion and a prune portion are described with respect to FIG. 5.

Upon receiving the PIM control message, control unit 22 of PE device 20 updates multicast state table 30 for the VPLS instance based on the downstream port on which the PIM control message was received and information for the multicast group snooped from the PIM control message (82). Control unit 22 also determines an upstream neighbor port of PE device 20 associated with the VPLS instance as a port connected to an upstream PIM neighbor device identified based on an upstream neighbor field included in the PIM control message (84).

Control unit 22 then relays the PIM control message on the upstream neighbor port of PE device 20 without flooding the PIM control message on all ports of PE device 20 associated with the VPLS instance (86). As described in this disclosure, "relaying" the PIM control message means that control unit 22 forwards the same PIM control message received on the downstream port of PE device 20 on the upstream neighbor port of PE device 20 without consuming the received PIM control message or forming a new PIM control message.

In this way, join suppression may be avoided because PE device 20 only forwards a received PIM join message on the upstream neighbor port connected to an upstream PIM neighbor device with a source device for the requested multicast group. PE device 20 does not forward the PIM join message on any downstream ports connected to PIM neighbor devices with receivers. Since the downstream ports connected to the PIM neighbor devices with receivers will not see join messages received on other downstream ports of PE device 20, the PIM neighbor devices will not suppress sending join requests for the same multicast groups upstream through PE router 20 toward the source device.

Figure 5:
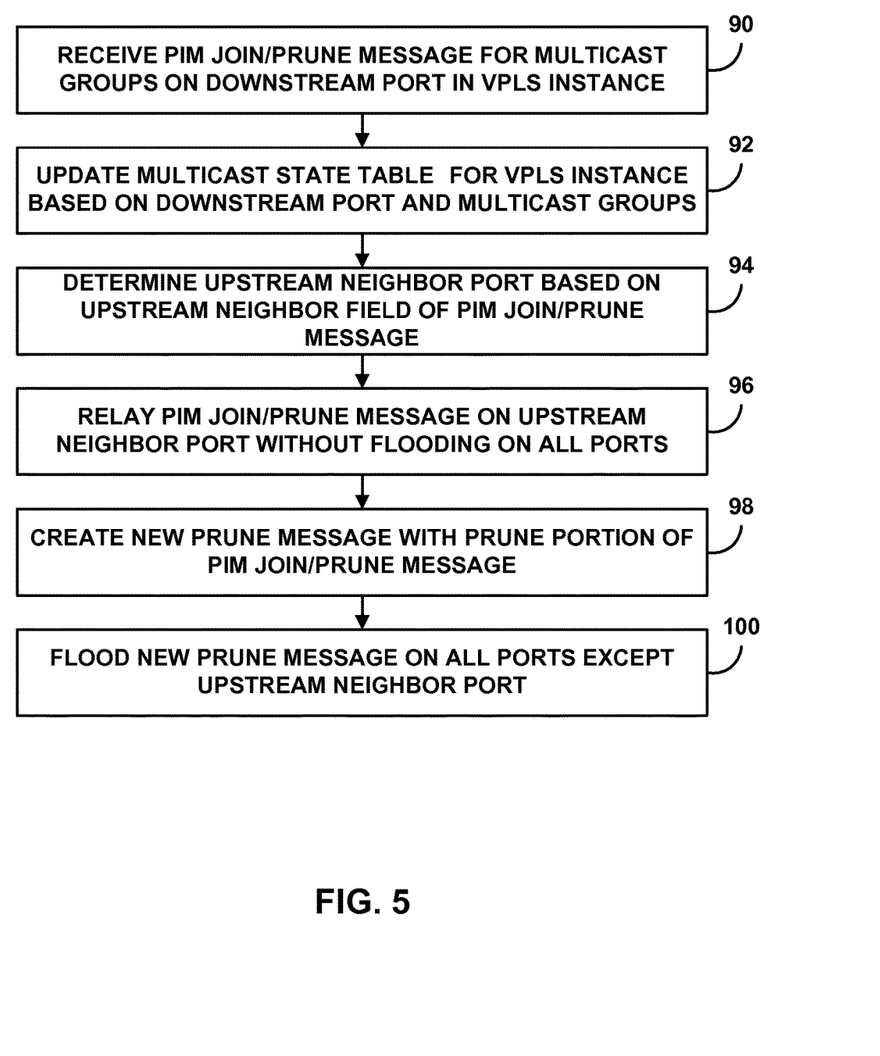
FIG. 5 is a flow chart illustrating an exemplary operation of a PE device in a PIM packet relay mode to flood PIM prune messages.

FIG. 5 is a flow chart illustrating an exemplary operation of a PE device in a PIM packet relay mode to flood PIM prune messages. The operation illustrated in FIG. 5 is described with respect to PE device 20 from FIG. 2. In other examples, other PE devices, such as PE devices 12 from FIG. 1 and PE device 60 from FIG. 3 may operate in the PIM packet relay mode in accordance with the techniques of this disclosure.

A downstream port of PE device 20 associated with the given VPLS instance receives a PIM join/prune message for multicast groups (90). The PIM join/prune message is a PIM control message that includes both a join portion and a prune portion of the message for different multicast groups from a downstream PIM neighbor device with receivers interested receiving or dropping traffic of the different multicast groups. As described in this disclosure, "receiving" the PIM join/prune message on a port means that PE device 20 snoops information included in the PIM join/prune message while forwarding the PIM join/prune message in the VPLS instance.

Upon receiving the PIM join/prune message, control unit 22 of PE device 20 updates multicast state table 30 for the VPLS instance based on the downstream port on which the PIM join/prune message was received and information for the multicast group snooped from the PIM join/prune message (92). For the join portion of the PIM join/prune message, control unit 22 adds the downstream port of PE device 20 as an outgoing interface for traffic of the requested multicast group in multicast state table 30 for the VPLS instance. For the prune portion of the PIM join/prune message, control unit 22 removes the downstream port of PE device 20 as an outgoing interface for traffic of the unrequested multicast group in multicast state table 30 for the VPLS instance.

Control unit 22 also determines an upstream neighbor port of PE device 20 associated with the VPLS instance as a port connected to an upstream PIM neighbor device identified based on an upstream neighbor field included in the PIM join/prune message (94). Control unit 22 then relays the PIM join/prune message on the upstream neighbor port of PE device 20 without flooding the PIM join/prune message on all ports of PE device 20 associated with the VPLS instance (96). As described in this disclosure, "relaying" the PIM join/prune message means that control unit 22 forwards the entire PIM join/prune message including both the join portion and the prune portion of the message on the upstream neighbor port of PE device 20 without consuming the received PIM join/prune message or forming a new PIM join/prune message.

For the prune portion of the PIM join/prune message, control unit 22 further creates a new prune message that includes only the prune portion of the PIM join/prune message (98). Control unit 22 then floods the new prune message on all ports of PE device 20 except on the upstream neighbor port on which the PIM join/prune message was relayed (100). In some examples, PE router 20 may receive a separate PIM prune message for a multicast group on a downstream port of PE router 20. In this case, control unit 22 of PE device 20 may simply flood the prune message on all ports of PE router 20.

The prune portion of the PIM control message or the separate PIM prune message for the multicast group is flooded to all ports of PE device 20 associated with the VPLS instance in order to inform the PIM neighbor devices with receivers interested in traffic of the multicast group to resend PIM join messages to override the prune request. In some examples, when a prune request for the multicast group is received on one of the downstream ports of PE router 20, control unit 22 may remove all the downstream ports as outgoing interfaces for traffic of the multicast group from multicast state table 30 for the VPLS instance. In this case, none of the downstream ports of PE router 20 will receive traffic of the multicast group, even if the traffic was earlier requested. Flooding the prune request on all the ports of the PE router 20 may trigger the PIM neighbor devices with receivers interested in the traffic to resend PIM join messages for the multicast group. Upon receiving the PIM join messages on one or more downstream ports of PE router 20, control unit 22 reinstalls the downstream ports as outgoing interfaces for traffic of the multicast group in multicast state table 30 for the VPLS instance.

Figure 6:
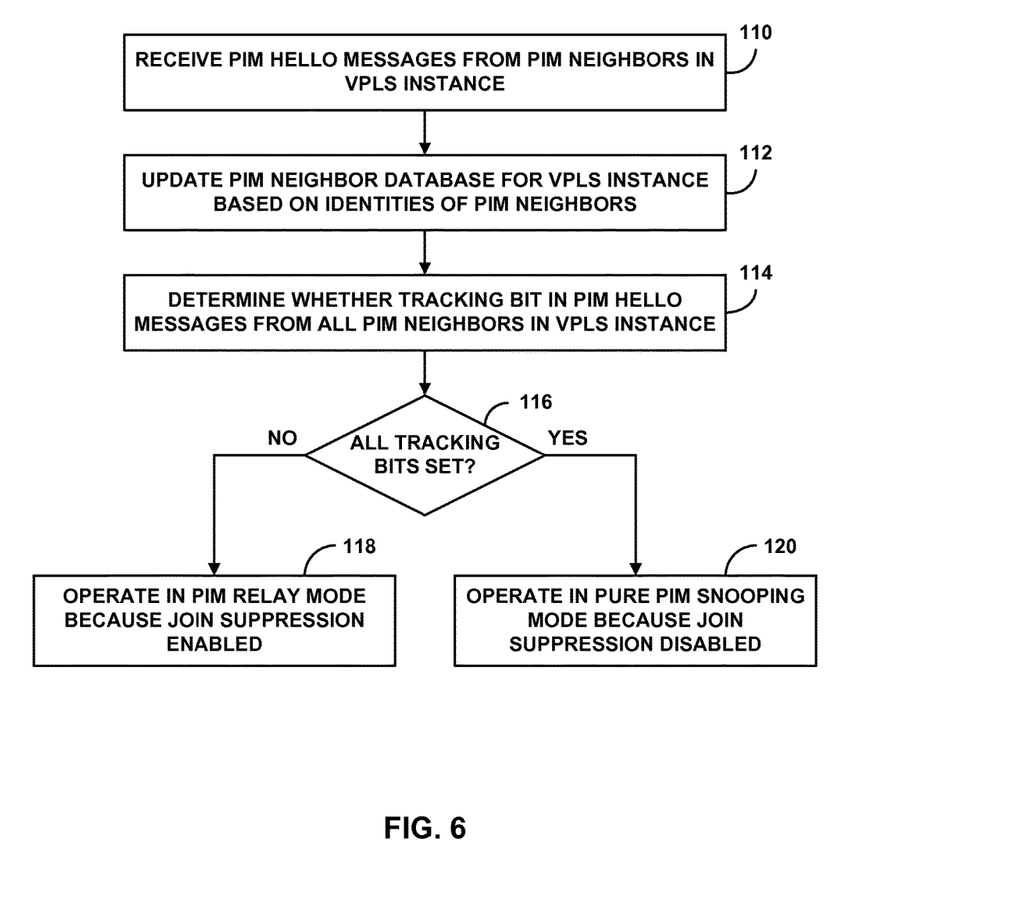
FIG. 6 is a flow chart illustrating an exemplary operation of a PE device determining whether to operate according to a PIM packet relay mode with snooping or according to a pure PIM snooping mode.

FIG. 6 is a flow chart illustrating an exemplary operation of a PE device determining whether to operate according to a PIM packet relay mode with snooping or according to a pure PIM snooping mode. The operation illustrated in FIG. 6 is described with respect to PE device 20 from FIG. 2. In other examples, other PE devices, such as PE devices 12 from FIG. 1 and PE device 60 from FIG. 3 may operate in the PIM packet relay mode in accordance with the techniques of this disclosure.

PE device 20 receives PIM Hello messages on one or more ports of PE device 20 that identify PIM neighbor devices included in the VPLS instance (110). The PIM neighbor devices may comprise PIM routers, such as CE devices 14 from FIG. 1 or CE devices 62 from FIG. 3, located at remote site networks of the VPLS instance. As described in this disclosure, "receiving" the PIM Hello messages on ports means that PE device 20 snoops information included in the PIM Hello messages while forwarding the PIM Hello messages in the VPLS instance.

Upon receiving the PIM Hello messages, control unit 22 of PE device 20 updates a PIM neighbor database 40 for the VPLS instance based on the identities of the PIM neighbor devices snooped from the PIM Hello messages (112). Control unit 22 then determines whether a tracking bit is included in each of the PIM Hello messages received from the PIM neighbor devices included in the VPLS instance (114). When the tracking bit is set by all the PIM neighbor devices (YES branch of 116), PE device 20 learns that join suppression is disabled in the VPLS instance. Control unit 22 of PE device 20 then operates in pure PIM snooping mode because join suppression is disabled in the VPLS instance (120). In PIM snooping mode, control unit 20 simply floods PIM control messages on all ports of PE device 20 associated with a given VPLS instance.

When the tracking bit is not set by all the PIM neighbor devices (NO branch of 116), PE device 20 learns that join suppression is enabled in the VPLS instance. Control unit 22 of PE device 20 then operates in PIM relay mode instance because join suppression is enabled (118). In PIM relay mode, control unit 20 uses PIM relay unit 36 to relay PIM control messages only on upstream neighbor ports of PE device 20 associated with a given VPLS instance without flooding the PIM control messages on all ports of PE router 20 associated with the VPLS instance. In this way, join suppression may be avoided, even when enabled in the VPLS instance. By only relaying the PIM control messages on upstream neighbor ports, the downstream ports of PE device 20 connected to PIM neighbor devices with receivers will not see join messages received on other downstream ports of PE device 20, and the PIM neighbor devices will not suppress sending join requests for the same multicast group upstream through PE device 20 toward a source device.

Various examples of the invention have been described. These and other examples are within the scope of the following claims.

The invention claimed is:

1. A method comprising:
   receiving, on a downstream port of a network switch device, a protocol independent multicast (PIM) control message for a multicast group, the downstream port being included in an instance of a virtual layer two network, wherein receiving the PIM control message comprises snooping information included in the PIM control message;
   determining an upstream neighbor port of the network switch device that is included in the same instance of the virtual layer two network as the downstream port, wherein determining the upstream neighbor port comprises determining a port of the network switch device that is connected to an upstream PIM neighbor device identified in an upstream neighbor field snooped from the PIM control message, and wherein the upstream neighbor port is toward a source for the multicast group; and
   relaying the PIM control message on the upstream neighbor port of the network switch device without flooding the PIM control message on all ports of the network switch device that are included in the same instance of the virtual layer two network, wherein relaying the PIM control message comprises forwarding the same PIM control message received on the downstream port of the network switch device on the upstream neighbor port of the network switch device without consuming the received PIM control message or forming a new PIM control message.

2. The method of claim 1, wherein the instance of the virtual layer two network comprises a virtual private local area network service (VPLS) instance.

3. The method of claim 1, wherein relaying the PIM control message comprises relaying the PIM control message on a set of upstream ports of the network switch device, the set of upstream ports included in the instance of the layer two virtual network, wherein the set of upstream ports at least includes the determined upstream neighbor port.

4. The method of claim 1,
   wherein receiving the PIM control message comprises receiving the PIM control message on a downstream attachment circuit (AC) port connected to a downstream PIM neighbor device, and
   wherein relaying the PIM control message comprises relaying the PIM control message on an upstream neighbor AC port connected to an upstream PIM neighbor device, and on any pseudo-wire (PW) ports connected to other network switch devices included in the instance of the virtual layer two network.

5. The method of claim 1,
   wherein receiving the PIM control message comprises receiving the PIM control message on a downstream pseudo-wire (PW) port of the network switch device connected to another network switch device included in the instance of the virtual layer two network, and
   wherein relaying the PIM control message comprises relaying the PIM control message on an upstream neighbor AC port connected to an upstream PIM neighbor device without sending the PIM control message on any PW ports of the network switch device.

6. The method of claim 1, further comprising updating a multicast state table maintained on the network switch device for the instance of the virtual layer two network based on the downstream port on which the PIM control message is received and information for the multicast group snooped from the PIM control message.

7. The method of claim 6, further comprising:
   receiving traffic of the multicast group on the upstream neighbor port of the network switch device; and
   forwarding the traffic of the multicast group on one or more downstream ports of the network switch device according to the multicast state table for the instance of the virtual layer two network.

8. The method of claim 6, wherein the PIM control message includes a join portion for the multicast group, and wherein updating the multicast state table comprises adding the downstream port of the network device as an outgoing interface for traffic of the multicast group.

9. The method of claim 6, wherein the PIM control message includes a prune portion for the multicast group, and wherein updating the multicast state table comprises removing the downstream port of the network device as an outgoing interface for traffic of the multicast group.

10. The method of claim 1, wherein the PIM control message includes only a join message, further comprising receiving a prune message on the downstream port of the network switch device, and flooding the prune message on all ports of the network switch device.

11. The method of claim 1, wherein the PIM control message includes both a join portion and a prune portion, further comprising:
relaying the PIM control message including both the join portion and the prune portion on the upstream neighbor port of the network switch device;
creating a new prune message including only the prune portion of the received PIM control message; and
flooding the new prune message on all ports of the network switch device except the upstream neighbor port.

12. The method of claim 1, further comprising:
receiving PIM Hello messages on ports of the network switch device that identify PIM neighbor devices included in the instance of the virtual layer two network, wherein receiving the PIM Hello messages comprises snooping identities of the PIM neighbor devices included in the PIM Hello messages; and
updating a PIM neighbor database maintained on the network switch device for the instance of the virtual layer two network based on the identities of the PIM neighbor devices snooped from the PIM Hello messages, wherein the upstream neighbor port is the port of the network switch device on which the identity of the upstream PIM neighbor device is snooped from the PIM Hello messages.

13. The method of claim 12, further comprising:
determining whether a tracking bit is included in each of the PIM Hello messages received from the PIM neighbor devices included in the instance of the virtual layer two network, wherein join suppression is enabled in the instance of the virtual layer two network when the tracking bit is not set by all the PIM neighbor devices; and
when join suppression is enabled in the instance of the virtual layer two network, operating the network switch device in a PIM relay mode to relay the PIM control message on the upstream neighbor port of the network switch device without flooding the PIM control message on all the ports of the network switch device that are included in the instance of the virtual layer two network.

14. A network switch device comprising:
one or more ports, wherein a downstream port of the network switch device receives a protocol independent multicast (PIM) control message for a multicast group, the downstream port being included in an instance of a virtual layer two network; and
a control unit including one or more processors in communication with the one or more ports, the control unit configured to:
snoop information included in the PIM control message,
determine an upstream neighbor port of the network switch device that is included in the same instance of the virtual layer two network as the downstream port, wherein, to determine the upstream neighbor port, the control unit is configured to determine a port of the network switch device that is connected to an upstream PIM neighbor device identified in an upstream neighbor field snooped from the PIM control message, wherein the upstream neighbor port is the port of the network switch device on which the identity of the upstream PIM neighbor device was snooped from the PIM Hello messages, and wherein the upstream neighbor port is toward a source for the multicast group, and
relay the PIM control message on the upstream neighbor port without flooding the PIM control message on all ports of the network switch device that are included in the same instance of the virtual layer two network, wherein the control unit is configured to forward the same PIM control message received on the downstream port of the network switch device on the upstream neighbor port of the network switch device without consuming the received PIM control message or forming a new PIM control message.

15. The network switch device of claim 14, wherein the instance of the virtual layer two network comprises a virtual private local area network service (VPLS) instance.

16. The network switch device of claim 14, wherein the control unit is configured to relay the PIM control message on a set of upstream ports of the network switch device, the set of upstream ports included in the instance of the virtual layer two network, wherein the set of upstream ports at least includes the determined upstream neighbor port.

17. The network switch device of claim 14,
wherein a downstream attachment circuit (AC) port of the network switch device connected to a downstream PIM neighbor device receives the PIM control packet, and
wherein the control unit is configured to relay the PIM control message on an upstream neighbor AC port connected to an upstream PIM neighbor device, and on any pseudo-wire (PW) ports of the network switch device connected to other network switch devices included in the instance of the virtual layer two network.

18. The network switch device of claim 14,
wherein a downstream pseudo-wire (PW) port of the network switch device connected to another network switch device receives the PIM control message, the another network switch device included in the same instance of the virtual layer two network, and
wherein the control unit is configured to relay the PIM control message on an upstream neighbor AC port connected to an upstream PIM neighbor device without sending the PIM control message on any PW ports of the network switch device.

19. The network switch device of claim 14, further comprising a multicast state table maintained for the instance of the virtual layer two network, wherein the control unit is configured to update the multicast state table based on the downstream port on which the PIM control message is received and information for the multicast group snooped from the PIM control message.

20. The network switch device of claim 19,
wherein the upstream neighbor port of the network switch device receives traffic of the multicast group; and
wherein the control unit is configured to forward the traffic of the multicast group on one or more downstream ports of the network switch device according to the multicast state table for the instance of the virtual layer two network.

21. The network switch device of claim 19, wherein the PIM control message includes a join portion for the multicast group, and wherein, to update the multicast state table, the control unit is configured to add the downstream port of the network device as an outgoing interface for traffic of the multicast group.

22. The network switch device of claim 19, wherein the PIM control message includes a prune portion for the multicast group, and wherein, to update the multicast state table, the control unit is configured to remove the downstream port of the network device as an outgoing interface for traffic of the multicast group.

23. The network switch device of claim 14, wherein the PIM control message includes only a join message and the downstream port of the network switch device further receives a prune message, and wherein the control unit is configured to flood the prune message on all ports of the network switch device.

24. The network switch device of claim 14, wherein the PIM control message includes both a join portion and a prune portion, and wherein the control unit is configured to:
   relay the PIM control message including both the join portion and the prune portion on the upstream neighbor port of the network switch device;
   create a new prune message including only the prune portion of the received PIM control message; and
   flood the new prune message on all ports of the network switch device except the upstream neighbor port.

25. The network switch device of claim 14, further comprising a PIM neighbor database maintained for the instance of the virtual layer two network,
   wherein the ports of the network switch device receive PIM Hello messages that identify PIM neighbor devices included in the instance of the virtual layer two network, and
   wherein the control unit is configured to snoop identities of the PIM neighbor devices included in the PIM Hello messages, and update the PIM neighbor database based on the identities of the PIM neighbor devices snooped from the PIM Hello messages, wherein the upstream neighbor port is the port of the network switch device on which the identity of the upstream PIM neighbor device is snooped from the PIM Hello messages.

26. The network switch device of claim 25, wherein the control unit is configured to:
   determine whether a tracking bit is included in each of the PIM Hello messages received from the PIM neighbor devices included in the instance of the virtual layer two network, wherein join suppression is enabled in the instance of the virtual layer two network when the tracking bit is not set by all the PIM neighbor devices; and
   when join suppression is enabled in the instance of the virtual layer two network, operate in a PIM relay mode to relay the PIM control message on the upstream neighbor port of the network switch device without flooding the PIM control message on all the ports of the network switch device that are included in the instances of the virtual layer two network.

27. The network switch device of claim 14, wherein the network switch device comprises a layer 3 routing device configured to operate as a layer 2 switching device for the instance of the virtual layer two network.

28. A non-transitory computer-readable medium comprising instructions that, when executed, cause one or more programmable processors of a network switch device to:
   receive a protocol independent multicast (PIM) control message for a multicast group on a downstream port of the network switch device, the downstream port being included in an instance of a virtual layer two network, wherein the instructions cause the one or more programmable processors to snoop information included in the PIM control message;
   determine an upstream neighbor port of the network switch device that is included in the same instance of the virtual layer two network as the downstream port, wherein the instructions cause the one or more programmable processors to determine a port of the network switch device that is connected to an upstream PIM neighbor device identified in an upstream neighbor field snooped from the PIM control message, and wherein the upstream neighbor port is toward a source for the multicast group; and
   relay the PIM control message on the upstream neighbor port of the network switch device without flooding the PIM control message on all ports of the network switch device that are included in the same instance of the virtual layer two network, wherein the instructions cause the programmable processors to forward the same PIM control message received on the downstream port of the network switch device on the upstream neighbor port of the network switch device without consuming the received PIM control message or forming a new PIM control message.

29. The non-transitory computer-readable medium of claim 28, wherein the instance of the virtual layer two network comprises a virtual private local area network service (VPLS) instance.

30. The non-transitory computer-readable medium of claim 28, further comprising instructions that cause the programmable processors to:
   update a multicast state table maintained on the network switch device for the virtual layer two network instance based on the downstream port on which the PIM control message is received and information for the multicast group snooped from the PIM control message; and
   forwarding traffic of the multicast group received on the upstream neighbor port of the network switch device on one or more downstream ports of the network switch device according to the multicast state table for the instance of the virtual layer two network.

31. The non-transitory computer-readable medium of claim 28, wherein the PIM control message includes only a join message, further comprising instructions that cause the programmable processors to receive a prune message on the downstream port of the network switch device, and flood the prune message on all ports of the network switch device.

32. The non-transitory computer-readable medium of claim 28, wherein the PIM control message includes both a join portion and a prune portion, further comprising instructions that cause the programmable processors to:
   relay the PIM control message including both the join portion and the prune portion on the upstream neighbor port of the network switch device;
   create a new prune message including only the prune portion of the received PIM control message; and
   flood the new prune message on all ports of the network switch device except the upstream neighbor port.

33. The non-transitory computer-readable medium of claim 28, further comprising instructions that cause the programmable processors to:
   receive PIM Hello messages on ports of the network switch device that identify PIM neighbor devices included in the instance of the virtual layer two network, wherein the instructions cause the one or more programmable processors to snoop identities of the PIM neighbor devices included in the PIM Hello messages;

update a PIM neighbor database maintained on the network switch device for the instance of the virtual layer two network based on the identities of the PIM neighbor devices snooped from the PIM Hello messages, wherein the upstream neighbor port is the port of the network switch device on which the identity of the upstream PIM neighbor device is snooped from the PIM Hello messages;

determine whether a tracking bit is included in each of the PIM Hello messages received from the PIM neighbor devices, wherein join suppression is enabled in the instance of the virtual layer two network when the tracking bit is not set by all the PIM neighbor devices; and when join suppression is enabled in the instance of the virtual layer two network, operating the network switch device in a PIM relay mode to relay the PIM control message on the upstream neighbor port of the network switch device without flooding the PIM control message on all the ports of the network switch device that are included in the instance of the virtual layer two network.

* * * * *